US012463505B2

(12) United States Patent
Daboul

(10) Patent No.: US 12,463,505 B2
(45) Date of Patent: Nov. 4, 2025

(54) GENERATOR OF A WIND TURBINE

(71) Applicant: Wobben Properties GmbH, Aurich (DE)

(72) Inventor: Hussam Daboul, Südbrookmerland (DE)

(73) Assignee: Wobben Properties GmbH, Aurich (DE)

( * ) Notice: Subject to any disclaimer, the term of this patent is extended or adjusted under 35 U.S.C. 154(b) by 277 days.

(21) Appl. No.: 17/795,771

(22) PCT Filed: Feb. 1, 2021

(86) PCT No.: PCT/EP2021/052246
§ 371 (c)(1),
(2) Date: Jul. 27, 2022

(87) PCT Pub. No.: WO2021/152164
PCT Pub. Date: Aug. 5, 2021

(65) Prior Publication Data
US 2023/0095783 A1 Mar. 30, 2023

(30) Foreign Application Priority Data

Jan. 31, 2020 (DE) ............... 10 2020 102 409.6

(51) Int. Cl.
| H02K 9/22 | (2006.01) |
| H02K 1/32 | (2006.01) |
| H02K 3/24 | (2006.01) |
| H02K 7/18 | (2006.01) |
| H02K 9/20 | (2006.01) |

(52) U.S. Cl.
CPC ............ *H02K 9/225* (2021.01); *H02K 1/32* (2013.01); *H02K 3/24* (2013.01); *H02K 7/1838* (2013.01); *H02K 9/20* (2013.01); *F05B 2220/706* (2013.01)

(58) Field of Classification Search
CPC .......... H02K 1/32; H02K 3/24; H02K 7/1838; H02K 9/20
USPC .......................................... 310/52, 54, 64, 66
See application file for complete search history.

(56) References Cited

U.S. PATENT DOCUMENTS

| 5,057,726 A * | 10/1991 | Mole ...................... H02K 1/182 |
| | | 310/67 R |
| 2006/0066156 A1 * | 3/2006 | Dong ..................... H02K 9/225 |
| | | 310/54 |
| 2012/0169158 A1 | 7/2012 | Buttner et al. |
| 2012/0248780 A1 * | 10/2012 | Casazza ................. H02K 9/225 |
| | | 290/55 |
| 2014/0232221 A1 | 8/2014 | Chang et al. |
| 2014/0306450 A1 | 10/2014 | Satoh et al. |

(Continued)

FOREIGN PATENT DOCUMENTS

| AU | 2011325251 A1 * | 5/2013 | ............. F03D 15/20 |
| EP | 2237398 A1 * | 10/2010 | ............. F03D 9/002 |
| EP | 2493059 A1 | 8/2012 | |

(Continued)

*Primary Examiner* — Jose A Gonzalez Quinones
(74) *Attorney, Agent, or Firm* — Seed Intellectual Property Law Group LLP

(57) ABSTRACT

The present application relates to a generator comprising: a stator, a rotor, in particular having a rotor band, and a heat pipe assembly which is thermally connected to the rotor in order to conduct heat which is generated by the rotor, in particular during operation of the generator.

17 Claims, 4 Drawing Sheets

(56) References Cited

U.S. PATENT DOCUMENTS

2019/0044402 A1    2/2019  Weber
2019/0280565 A1*  9/2019  Kitahara ................. H02K 1/32

FOREIGN PATENT DOCUMENTS

| JP | S60118038 A | | 6/1985 |
|---|---|---|---|
| JP | 2014241687 A | * | 12/2014 |

* cited by examiner

GENERATOR OF A WIND TURBINE

BACKGROUND

Technical Field

The present invention relates to a generator of a wind turbine and to a wind turbine having such a generator.

Description of the Related Art

From a mechanical point of view, generators usually consist of a stationary part, the so-called stator, and a part, the so-called mechanical rotor, which rotates, in particular revolves, about a longitudinal axis of the mechanical stator.

An air gap is situated between the mechanical stator and the mechanical rotor.

The mechanical stator consists essentially of a stator ring which carries an electrical stator.

The mechanical rotor consists essentially of a rotor ring, which is also referred to as a rotor band, which carries an electrical rotor.

Depending on the embodiment of the generator, the electrical stator and the electrical rotor can be formed from electrical windings and/or permanent magnets and rotate about a longitudinal axis inside or outside the stator.

A market-driven increase in output density of electrical generators, in particular in the field of wind turbines, is resulting in ever greater heat flux densities inside the generator which can cause deformations in the region of the support structures of the generator, i.e., in particular deformations at the stator and/or rotor ring.

These deformations can cause the generator to become unbalanced and, in the worst-case scenario, cause the rotor to knock against the stator and the generator to be damaged such that the generator is no longer operational.

Different cooling approaches, such as for example water-cooling in the region of the stator of the generator, are usually used to manage these heat flux densities, referred to below simply as heat.

Subsequent increases in output such as, for example, so-called repowering of the generator can, however, mean that the previously provided cooling approach is no longer sufficient to dissipate the additional heat which is generated by the repowering.

It can therefore occur that the generator is no longer sufficiently cooled after repowering.

As a result, differences in temperature can occur in the support structure of the generator, which can cause deformations thereof, in particular deformations of the support structure of the rotor, the so-called rotor band.

The following prior art relating to the present application has been identified by a search made by the German Patent and Trademark Office: US 2012/0169158 A1, US 2012/0248780 A1, US 2014/0232221 A1, US 2019/0044402 A1, and US 2019/0280565 A1.

BRIEF SUMMARY

Provided are systems and methods for the possibility of sufficiently cooling a generator of a wind turbine in a simple and expedient fashion even after repowering of the generator, in particular in such a way that no deformations occur at the support structure of the rotor. Alternatively, it is intended that an alternative to the prior art is provided.

A generator of a wind turbine is thus proposed comprising: a stator, a rotor, in particular having a rotor band, and a heat pipe assembly which is thermally connected to the rotor in order to conduct heat which is generated by the rotor, in particular during operation of the generator.

The generator is thus designed as a conventional electrical generator and consists essentially of a stator, having an axis of rotation, and a rotor rotating about the axis of rotation.

The generator is designed, for example, as a multi-phase synchronous or asynchronous generator.

In a preferred embodiment, the generator is designed as a high-pole, in particular separately excited synchronous generator.

A heat pipe assembly is moreover arranged at the rotor, in particular at the support structure of the rotor, the rotor band, such that the heat pipe assembly is thermally connected to the rotor in such a way that the heat pipe assembly can conduct, in particular distribute and equalize or dissipate, heat which is generated by the rotor, in particular during the operation of the generator.

For this purpose, the heat pipe assembly can be screwed or adhesively bonded, for example, to the rotor band of the rotor, for example in the form of a plurality of heat pipes.

In a preferred embodiment, the heat pipe assembly is arranged at the rotor band on a side facing away from the air gap, i.e., on that side of the rotor which faces away from the air gap and in particular the stator.

The heat pipe assembly is moreover designed essentially as a heat transfer means or heat exchanger and is formed, for example, from heat pipes or as a two-phase thermosiphon and functionally comprises essentially an evaporator, a transport means, and a condenser.

At least the evaporator is preferably arranged directly on the rotor, in particular the rotor band, and connected in particular thermally to the rotor, in particular the rotor band.

In a preferred embodiment, the heat pipe assembly is formed from at least one heat pipe which is made in particular from copper or aluminum and is configured to conduct water or ammonia.

In a preferred embodiment, the heat pipe is formed from copper and configured to conduct water as a cooling medium.

In a particularly preferred embodiment, the heat pipe has inside at least one metal wire mesh, in particular a copper wire mesh, which is configured to generate a capillary effect inside the heat pipe for a cooling medium, in particular for the water or ammonia.

In a particularly preferred embodiment, the heat pipe assembly is designed to perform at least one selective reduction in temperature at the rotor band by 20 Kelvin during the operation of the generator.

It is particularly advantageous in the case of the heat pipe assembly described herein that the heat pipe assembly can be retrofitted to the generator simply without there being any need to reconfigure or redesign the generator.

The heat pipe assembly is preferably fastened axially to the rotor, in particular to a rotor band, preferably such that equalization of the temperature at the rotor, in particular at the rotor band, occurs.

The heat pipe assembly is thus arranged axially with respect to the rotor, in particular on a side of the rotor which faces away from the air gap and in particular the stator.

In a preferred embodiment, the heat pipes are attached axially on the rotor, for example on the side facing away from the air gap, in particular by being adhesively bonded or screwed thereto.

It is therefore in particular proposed that the heat pipe assembly and in particular the heat pipes are connected to the rotor and in particular to the rotor band in a heat-conducting fashion or thermally.

In a further preferred embodiment, the heat pipes have a length which corresponds essentially to the axial length of the rotor or the rotor band.

The heat pipe assembly is moreover in particular designed and preferably arranged on the rotor band such that the temperature at the rotor, in particular at the rotor band, is equalized.

As a result, it is in particular ensured that the rotor, in particular the rotor band, has a temperature which is essentially the same and over all the sections. The heat pipe assembly is therefore in particular used to equalize the temperature of the rotor.

Alternatively or additionally, a (or the) heat pipe assembly can be fastened radially on the rotor, in particular in the vicinity of or on a rotor band, preferably such that there is a local reduction in the temperature at the rotor, in particular at the rotor band.

For example, the rotor has a rotor support structure, the rotor band, and rotor windings arranged on the rotor support structure. In addition, a pole shoe or pole shoe core can be provided which is configured to conduct magnetic fields of the rotor windings. The pole shoe core can be fastened, for example, by means of screws, the so-called pole shoe fastening screws, to the rotor support structure. In such cases, for example, individual screws which connect the pole shoe core to the rotor support structure can be replaced by the heat pipe assembly, in particular by heat pipes.

For this purpose, individual screws on the drive side of the generator are preferably replaced by heat pipes.

It is therefore in particular proposed to use heat pipes at least partially instead of screws in order to reduce the temperature at the rotor band locally.

For this purpose, the heat pipes are inserted radially with respect to the axis of rotation of the generator and replace, for example, a screw of the pole shoe fastening screws.

The heat pipe assembly is preferably formed from at least one hollow conductor, in particular a pipe, which is configured to conduct a fluid, in particular water.

The hollow conductor or conductors is or are preferably designed as heat pipes.

The hollow conductor is particularly preferably designed as essentially flat.

In a particularly preferred embodiment, the hollow conductor has an essentially flat design and has a metal wire mesh inside which is configured to generate a capillary effect for the fluid or the cooling medium.

The hollow conductor, in particular the pipe, is preferably formed from metal, preferably from copper or aluminum.

The heat pipe assembly is preferably formed from a plurality of hollow conductors and from metal.

The plurality of hollow conductors are preferably arranged along a periphery of the rotor, and in particular spaced apart therefrom, in particular spaced apart symmetrically relative to one another, for example parallel to one another in an axial direction and offset by 30° relative to one another in a radial direction.

The heat pipe assembly preferably has at least one evaporator, a condenser, and a section connecting the evaporator to the condenser, in particular wherein the evaporator is arranged on a first side at the rotor, in particular at the rotor band, and the condenser is arranged on a second side at the rotor, in particular at the rotor band, wherein the first side has a higher operating and/or ambient temperature during operation of the generator than the second side.

It is thus in particular also proposed that the heat pipe assembly is formed from a plurality of heat pipes, wherein each heat pipe functionally has an evaporator and a condenser which are connected to each other.

The heat pipe preferably here has an essentially completely symmetrical structure and is fastened to the rotor band in such a way that the evaporator is arranged on the warm side and the condenser is arranged on the cold side. It is therefore in particular proposed that there are no geometrical or physical differences between the condenser and the evaporator and instead there are in particular only functional differences.

The evaporator is preferably formed from at least one hollow conductor, in particular made from copper or aluminum, and is configured to conduct at least one fluid, in particular water.

The evaporator is preferably formed from a plurality of hollow conductors and a plurality of evaporators are provided which are arranged, spaced apart relative to one another, on the rotor.

It is therefore in particular proposed that the heat pipe assembly is formed from a plurality of systems.

Reliability can be increased as a result.

The generator preferably moreover has a gap monitoring system, in particular an air gap measuring system or a generator gap monitoring system, which is configured to detect a gap clearance.

The generator therefore has a monitoring unit which is configured to monitor the clearance between the stator and the rotor or a different gap size.

If, for example, the cooling by the heat pipe assembly is no longer sufficient because the generator is operated above its load limit, a change in the gap, for example the air gap between the stator and the rotor, occurs.

If a value falls below a preset threshold value, i.e., if for example the clearance between the stator and the rotor is not large enough, the air gap measuring system reports this, for example, to the generator control system, whereupon the generator control system shuts down the generator or effects an emergency stop.

As an alternative to the air gap measuring system, it is also possible for a generator gap monitoring system to be used which monitors gap sizes in the support structure of the generator and, if a value falls below a predetermined threshold value, likewise shuts down the generator or effects an emergency stop.

BRIEF DESCRIPTION OF THE SEVERAL VIEWS OF THE DRAWINGS

The present invention is now explained in detail below by way of example and with the aid of exemplary embodiments and with reference to the attached drawings.

DETAILED DESCRIPTION

Figure 1:
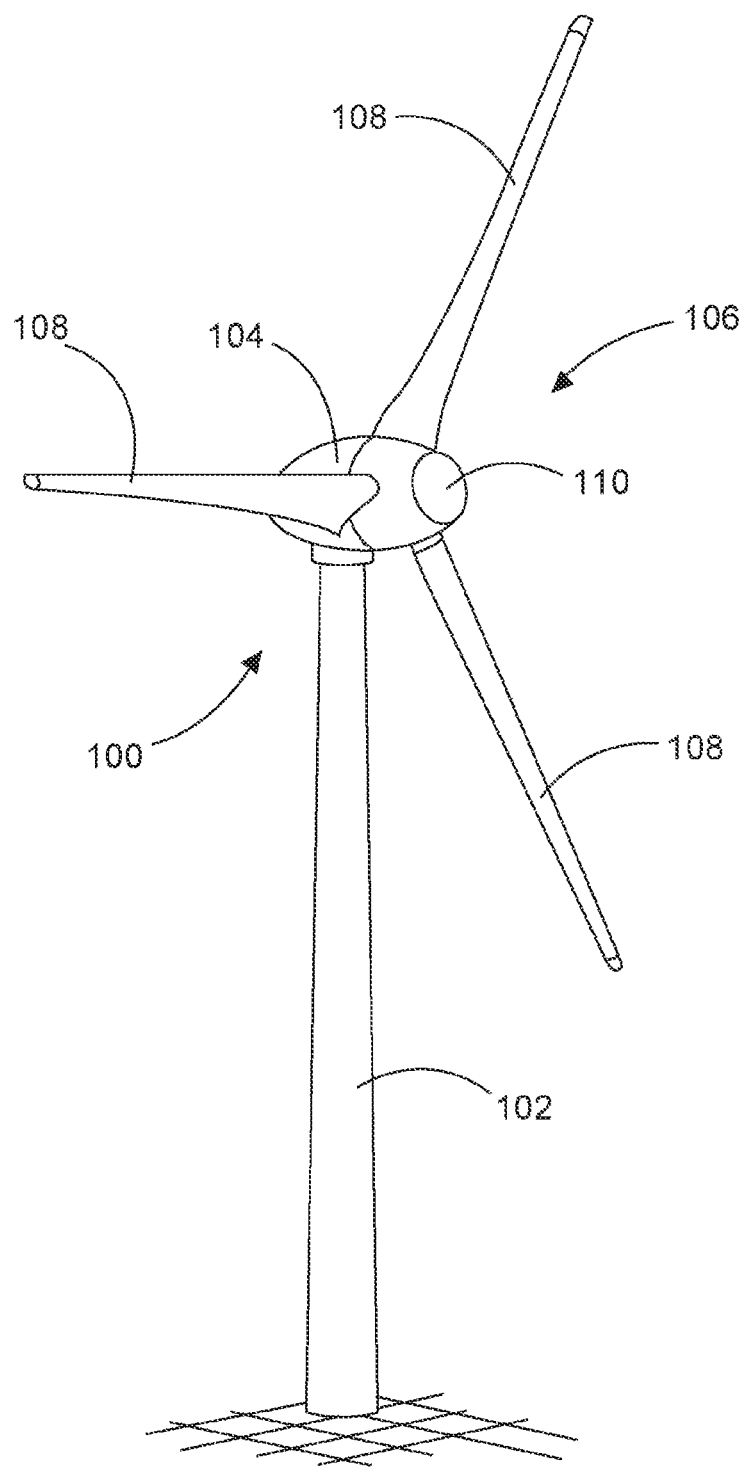
FIG. 1 shows a schematic view of a wind turbine according to an embodiment.

FIG. 1 shows a schematic view of a wind turbine 100.

The wind turbine 100 has a tower 102 and a nacelle 104. An aerodynamic rotor 106 with three rotor blades 108 and a spinner 110 is arranged on the nacelle 104. The rotor 106 is set in rotational movement during operation by the wind and consequently drives a generator, described above or below, in the nacelle 104.

Figure 2A:
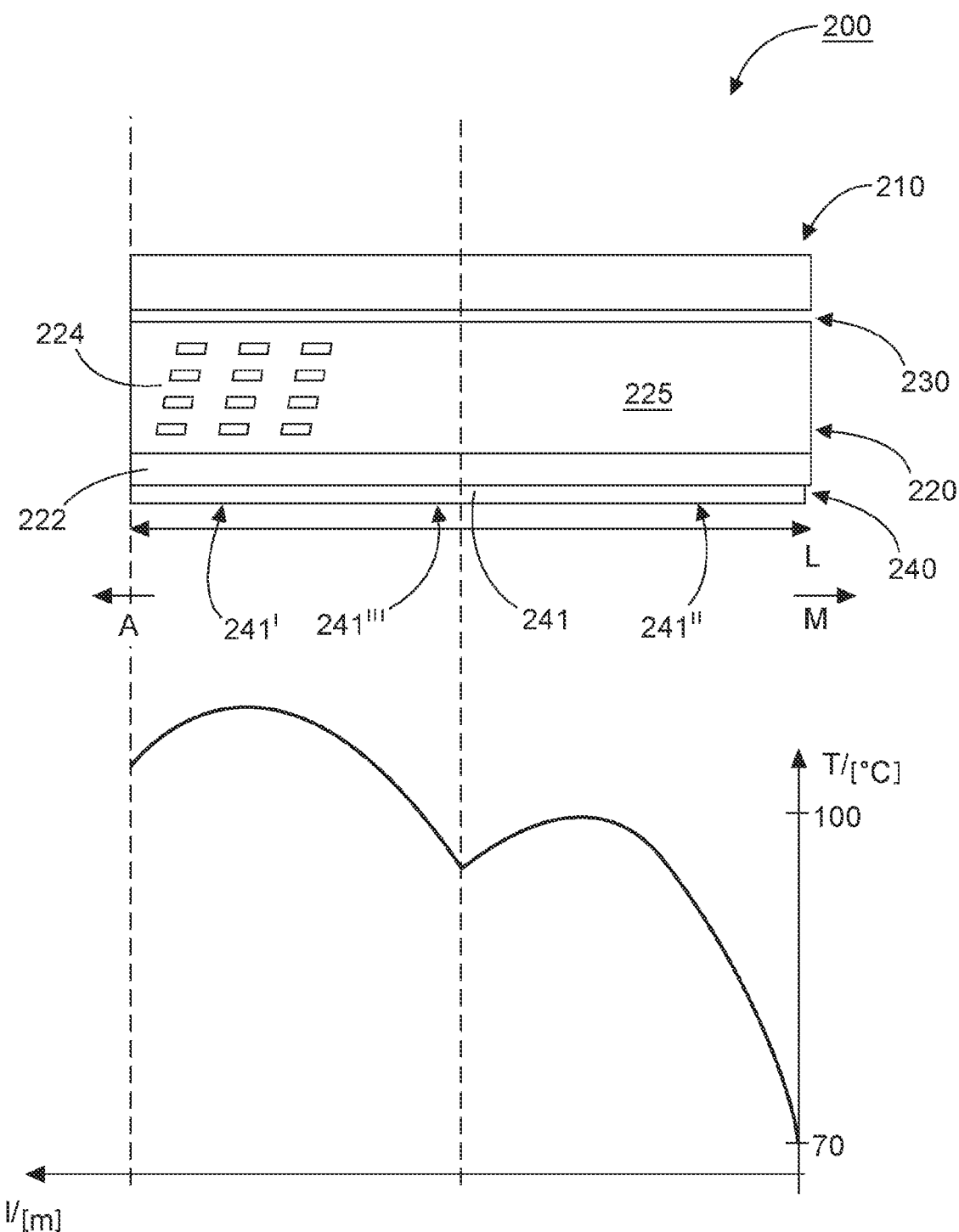
FIG. 2A shows a first schematic view of a generator of a wind turbine according to an embodiment.

FIG. 2A shows a first schematic view of a portion of a generator 150 of a wind turbine, in particular as shown in FIG. 1, according to an embodiment, in particular in a radial cross-section.

The generator 200 essentially comprises a stator 210, having a longitudinal axis L, and a rotor 220, rotating about the longitudinal axis of the stator.

An air gap 230 is arranged between the stator 210 and the rotor 220.

In addition, the generator has a side A which is associated with the drive, the so-called drive side, and a side M which is associated with the machine, the so-called machine side.

The generator 200 is in addition designed as an internal rotor, i.e., the rotor 220 rotates inside the stator 210 and the longitudinal axis.

The rotor 220 has a rotor support structure, the rotor band 222, and a rotor winding 224 which are arranged on the rotor support structure.

In addition, a pole shoe or pole shoe core 225 is preferably provided which is fastened to the rotor band 222 by means of screws, the pole shoe fastening screws, and is provided to guide magnetic field lines of the rotor winding 224.

The heat pipe assembly 240 is arranged below the rotor support structure 222, i.e., on that side of the rotor 220 which faces away from the air gap, essentially over the whole axial length of the rotor 220, in particular of the rotor band 222.

The heat pipe assembly 240 is here fastened axially to the rotor 220 such that equalization of the temperature at the rotor 220, in particular at the rotor band 222, occurs.

In a preferred embodiment, the heat pipe assembly 240 is formed from a plurality of heat pipes 241 which run axially along the rotor 220, spaced apart from one another.

The heat pipe 241 has an evaporator 241', a condenser 241", and a section 241' connecting the evaporator 241' and the condenser 241".

The evaporator 241' is arranged on the drive side A and the condenser 241" is arranged on the machine side M.

The temperature T of the rotor band 222 plotted against the length 1 of the rotor band 222 is correspondingly depicted below the generator.

The drive side A here has a temperature of up to approximately 110° C. and the machine side M here has a temperature of up to approximately 90° C. The drive side A is thus warmer than the machine side M. Consequently, the evaporator 241' is also arranged at the warmer drive side A and the condenser 241" at the colder machine side.

Figure 2B:
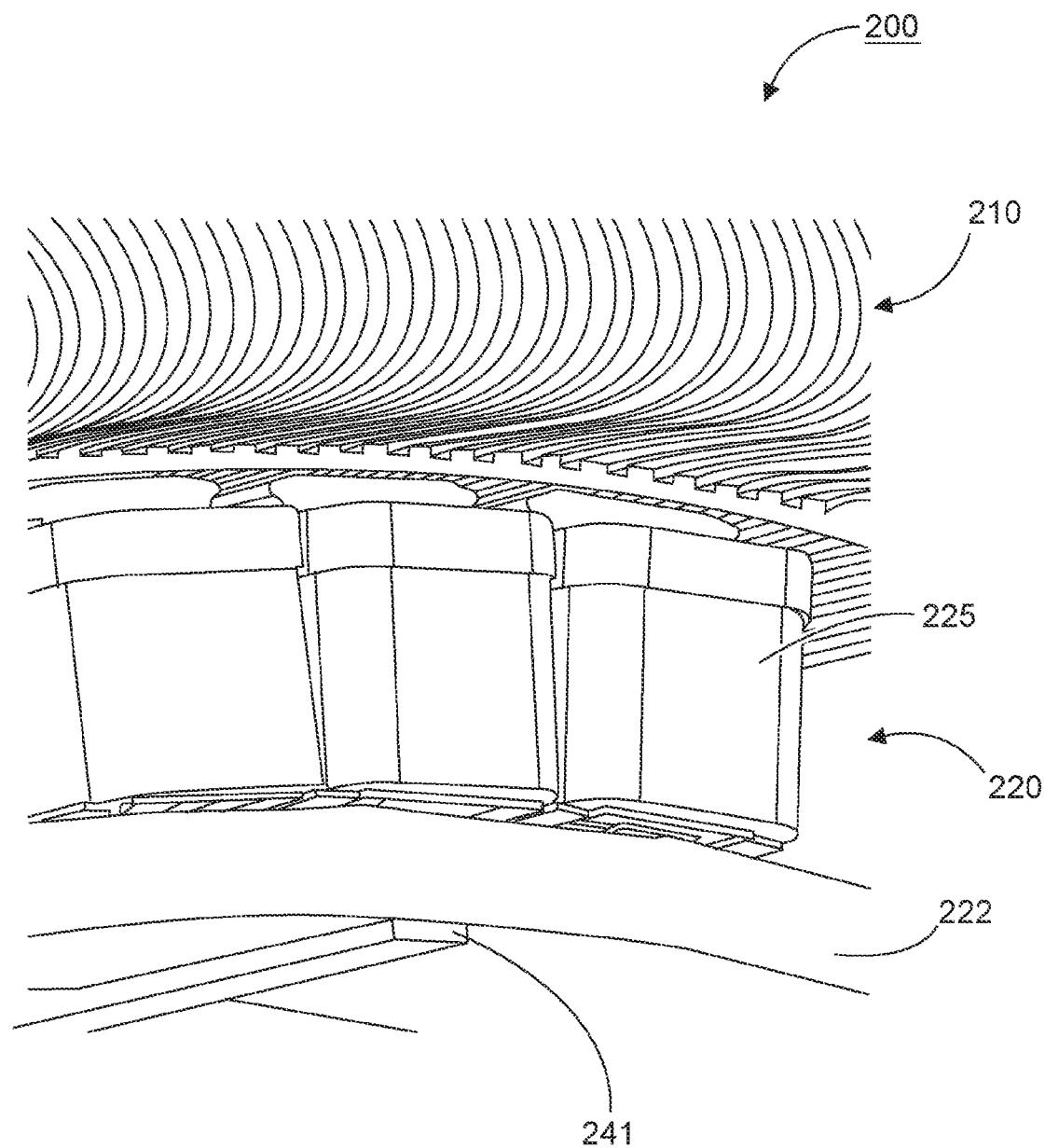
FIG. 2B shows a second schematic view of a generator of a wind turbine according to an embodiment.

FIG. 2B shows a second schematic view of a generator 200, in particular as shown in FIG. 2A, of a wind turbine, in particular as shown in FIG. 1, in a further view.

The generator 200 comprises a stator 210 and a rotor 220.

The rotor 220 has a rotor band 222 with a pole shoe core 225 fastened thereto which is formed from a plurality of pole shoes. The pole shoe core 225 is fastened to the rotor band, for example, by means of pole shoe fastening screws.

A heat pipe 241, which is part of a heat pipe assembly, is arranged on the rotor band 222, on that side of the rotor 222 which faces away from the air gap.

The heat pipe 241 is essentially flat and preferably formed from copper and is configured to conduct water as a cooling medium.

In a preferred embodiment, the heat pipe is designed as a flat copper hollow pipe which has a copper wire mesh inside which is configured to generate a capillary effect for the cooling medium.

Figure 3:
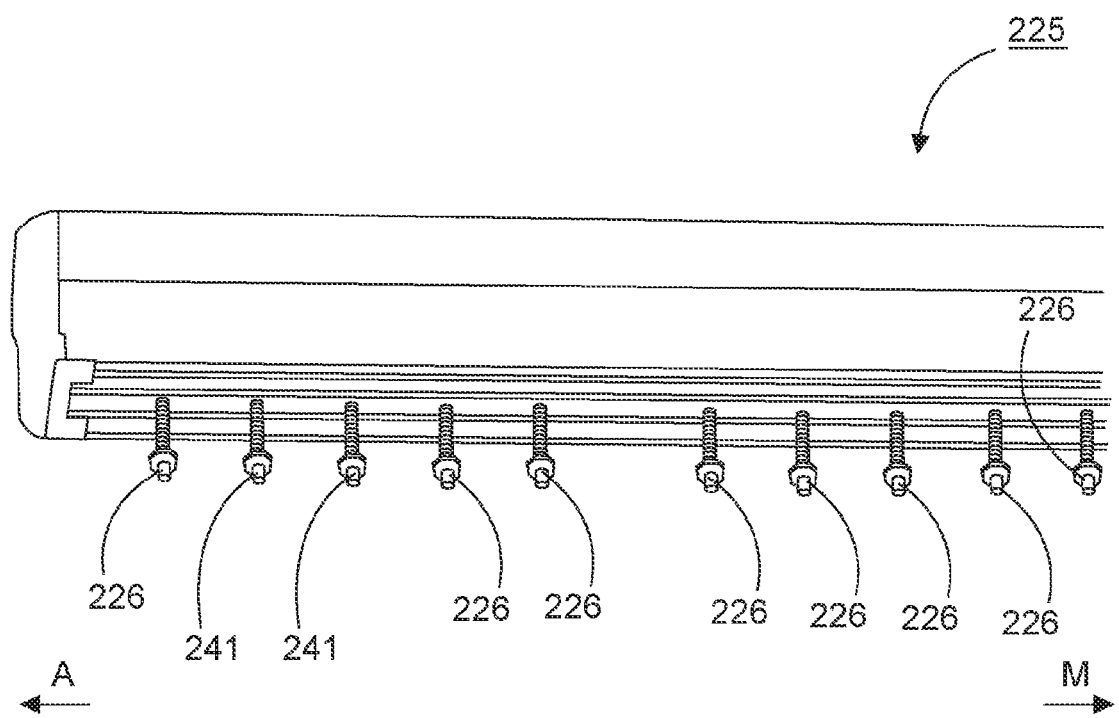
FIG. 3 shows a schematic view of a pole shoe core of a generator of a wind turbine according to a further embodiment.

FIG. 3 shows a schematic view of a pole shoe core 225 of a generator 200, in particular as shown in FIGS. 2A and 2B, of a wind turbine, in particular as shown in FIG. 1, according to a further embodiment.

The pole shoe core 225 is made from a highly permeable material, for example iron, and is configured to guide the magnetic field lines of the rotor windings in a defined form, in particular to allow them to pass outside and to distribute them.

The pole shoe core 225 is fastened to the rotor band by means of pole shoe fastening screws 226.

Isolated pole shoe fastening screws, in particular of the drive side A, are replaced by heat pipes 241.

The heat pipes 241 therefore run along the rotor and effect a reduction in a local temperature at the rotor or a local reduction in the temperature at the rotor, in particular the rotor band.

The proposed heat pipe assembly can therefore be used in particular by being fitted subsequently and contributes to homogenizing the temperature of the support structure of the generator.

LIST OF REFERENCE NUMERALS 100 wind turbine
102 tower of a wind turbine
104 nacelle of a wind turbine
106 aerodynamic rotor of a wind turbine
108 rotor blades of a wind turbine
110 spinner of a wind turbine
200 generator of a wind turbine
210 stator of the generator
220 rotor of the generator
222 rotor band of the rotor
224 rotor windings of the rotor
225 pole shoe core of the rotor
226 pole shoe fastening screws of the pole shoe core
230 air gap between stator and rotor
240 heat pipe assembly
241 heat pipe
241' evaporator
241" condenser
241''' connecting section
A drive side
M machine side
L longitudinal axis of the stator
T temperature
l length

The invention claimed is:

1. A generator of a wind turbine, comprising:
a stator,
a rotor, and
a heat pipe assembly thermally connected to the rotor to distribute and equalize heat generated by the rotor during operation of the generator,
wherein the rotor has a rotor band, and
wherein the heat pipe assembly is fastened axially to the rotor band such that equalization of a temperature at the rotor band occurs.

2. The generator as claimed in claim 1, wherein the heat pipe assembly is fastened radially on the rotor.

3. The generator as claimed in claim 1, wherein the heat pipe assembly includes at least one hollow conductor configured to conduct a fluid.

4. The generator as claimed in claim 1, wherein the heat pipe assembly includes at least one hollow conductor that is a pipe and is made from metal.

5. The generator as claimed in claim 1, wherein the heat pipe assembly includes a plurality of hollow metal conductors.

6. The generator as claimed in claim 1, wherein the heat pipe assembly has an evaporator, a condenser, and a section connecting the evaporator to the condenser.

7. The generator as claimed in claim 6, wherein the evaporator includes a hollow conductor configured to conduct at least one fluid.

8. The generator as claimed in claim 6, wherein the evaporator includes a plurality of hollow conductors, and wherein the heat pipe assembly includes a plurality of evaporators that are arranged, spaced apart relative to one another, on the rotor.

9. The generator as claimed in claim 1, comprising a gap monitoring system configured to detect a gap clearance between the stator and the rotor.

10. A wind turbine comprising a generator as claimed in claim 1.

11. The generator as claimed in claim 2, wherein the rotor has a rotor band, wherein the heat pipe assembly is fastened radially on the rotor proximate to or on the rotor band to cause a local reduction in a temperature at the rotor band.

12. The generator as claimed in claim 3, wherein the fluid is water.

13. The generator as claimed in claim 4, wherein the metal includes copper or aluminum.

14. The generator as claimed in claim 6, wherein the evaporator is arranged on a first side at the rotor, and the condenser is arranged on a second side at the rotor, wherein the second side is opposite the first side.

15. The generator as claimed in claim 14, wherein the first side has a higher temperature than the second side during operation of the generator.

16. The generator as claimed in claim 7, wherein the hollow conductor is made from a material that includes copper or aluminum, wherein the at least one fluid includes water.

17. The generator as claimed in claim 9, wherein the gap monitoring system is an air gap measuring system or a generator gap monitoring system.

* * * * *